United States Patent [19]

Bremer

[11] Patent Number: 5,382,783
[45] Date of Patent: Jan. 17, 1995

[54] FALSE BAR CODE INHIBITOR CIRCUIT

[75] Inventor: Edward C. Bremer, Rochester, N.Y.

[73] Assignee: PSC Inc., Webster, N.Y.

[21] Appl. No.: 59,797

[22] Filed: May 10, 1993

[51] Int. Cl.$^6$ .......................... G06K 7/10; G06K 7/14
[52] U.S. Cl. ..................... 235/462; 235/466; 235/472
[58] Field of Search ............ 235/462, 466, 472

[56] References Cited

U.S. PATENT DOCUMENTS

| | | |
|---|---|---|
| 4,000,397 | 12/1976 | Hebert et al. |
| 4,146,782 | 3/1979 | Barnich ............... 235/466 |
| 4,148,010 | 4/1979 | Shiau .................. 235/466 |
| 4,158,436 | 6/1979 | Vanderheyden ........ 235/466 |
| 4,431,912 | 2/1984 | Dickson et al. ........ 235/466 |
| 4,578,570 | 3/1986 | Mazumder ............. 235/466 |
| 4,713,785 | 12/1987 | Antonelli et al. ...... 235/466 |
| 5,103,080 | 4/1992 | Barkan . |
| 5,142,130 | 8/1992 | Sato . |

*Primary Examiner*—Harold Pitts
*Attorney, Agent, or Firm*—M. Lukacher; G. Leinberg

[57] ABSTRACT

A false bar code inhibitor circuit includes a detector, a signal restore circuit, a comparator, a software controller, and a high impedance clamp circuit. Basically, the detector circuit detects the first transition from either high to low reflectivity or low to high reflectivity. The transition triggers the signal restore circuit which is set for a time constant which is longer than the longest possible time needed to encounter another transition during a valid bar code read. Each time a transition is encountered, the signal restore circuit is triggered. The externally adjustable comparator circuit compares the output from the signal restore circuit against a limit, which can be adjusted by the software controller. The output of the comparator drives a clamp which controls when the bar code digitizer can pass an output. With the software controller, the output of the comparator can be controlled allowing for control over the digitizer output. With the false bar code inhibitor a false bar generated at the start of a bar code scan can be masked. The inhibitor circuit also creates a "window" which is used to mask out valid bar code from a signal. Additionally, the inhibitor circuit allows for external control for adjusting threshold levels and for external control over the bar code digitizer output.

9 Claims, 4 Drawing Sheets ound # FALSE BAR CODE INHIBITOR CIRCUIT

FIELD

This invention relates generally to a control circuit for a bar code reader and, more particularly, to a false bar code inhibitor circuit for a bar code reader.

BACKGROUND

Basically, bar code readers operate by scanning light over a bar code which consists of a series of black and white bars. The light returned from the bar code is detected by the bar code reader and converted to an electrical signal. This signal is then processed to read the bar code. A variety of factors can create false reads, thus producing an incorrect output.

For example, most bar codes readers have had difficulties in determining when a bar code sequence begins. Often the light from the bar code reader moves from a grey background area to a highly reflective white zone before encountering the first black bar. The initial transition from the grey background to the white zone can generate a pulse in the signal which is falsely read as a black bar. As a result, the bar code reader outputs the wrong bar code.

Not only have most bar code readers had difficulties in determining the starting point of a bar code, they have also had similar difficulties in determining when to stop. Accordingly, some bar scanners accidentally scan an additional false bar which also produces an incorrect output.

Additionally, most bar code readers have failed to provide users with the ability to control externally the threshold levels for the bar code reader to detect a black bar or to control when the output of the bar code digitizer is blocked. With some applications, an external adjustment of the threshold level would be desirable because the readers could be adjusted to particular bar code labels. In other applications, it would be desirable to be able to shut off the output of a digitizer both during and after a scan.

One example of a prior bar code reader with control circuitry is U.S. Pat. No. 5,142,130 to Sato. Sato discloses a bar code reading system and bar code reading apparatus with start margin or zone detection circuitry. The start margin recognizing circuitry first checks the width of the white bar. If the width of the white bar is not normal, then the start margin detection circuitry judges that there is a black bar where the signal has a steep increase in the signal level, above a predetermined level, and that the prior increase was noise. Sato does not consider the problems discussed above, such as determining when an actual bar code read begins. Sato's start margin detection circuitry can not determine when a read begins since, it can only attempt to determine erroneous readings between black bars, by measuring the width of the separating white bar.

Another example of a prior bar code reader with control circuitry is U.S. Pat. No. 5,103,080 to Barkan which discloses a digitizer for a bar code. The circuit includes a retriggerable one-shot circuit triggered by a signal from the scanner. The one-shot circuit does not time out as long as a series of pulses from the digitizer that exceed the threshold of the one-shot circuit. There is no assurance that an actual bar is being detected in the control circuit of the Barkan patent and the circuit does not provide any means of externally setting the threshold level or allowing for any type of external control over the output of the bar code digitizer.

The present invention provides for use in a bar code reader, improved circuitry for inhibiting false and erroneous bar code reading.

SUMMARY

According to the present invention, these and other objects and inventions are achieved in a false bar code inhibitor circuit for a bar code reader which includes a detector circuit, a signal restore circuit, an externally adjustable comparator circuit, a software controller, and a high impedance clamp circuit. Basically, the detector circuit detects the first transition from either high to low reflectivity or low to high reflectivity. The transition triggers the signal restore circuit which is set for a time constant which is longer than the longest possible time needed to encounter another transition during a valid bar code read. Each time a transition is encountered, the signal restore circuit is triggered. The externally adjustable comparator circuit compares the output from the signal restore circuit against a limit, which can be adjusted by the software controller. With the software controller, the output of the comparator can be controlled allowing for control over the digitizer output. In a preferred embodiment, the output of the comparator drives a clamp which controls when the bar code digitizer can pass an output.

The false bar code inhibitor circuit effectively inhibits the output of bar code until a low to high reflective transitions or until a high to low reflective transition has been detected, thus preventing an initial false bar read. The false bar code inhibitor circuit also creates a "window" which can be used to mask out false bars from valid bar code. Additionally, the false bar code inhibitor circuit allows for external control over the limit used by the comparator and, thus for external control over the size of the window and over when the output of the bar code digitizer is passed out.

BRIEF DESCRIPTION OF THE DRAWINGS

The foregoing and with other and further objects, advantages and capabilities of the invention will become apparent from description with references made to the accompanying drawings and in which.

DETAILED DESCRIPTION

Figure 1:
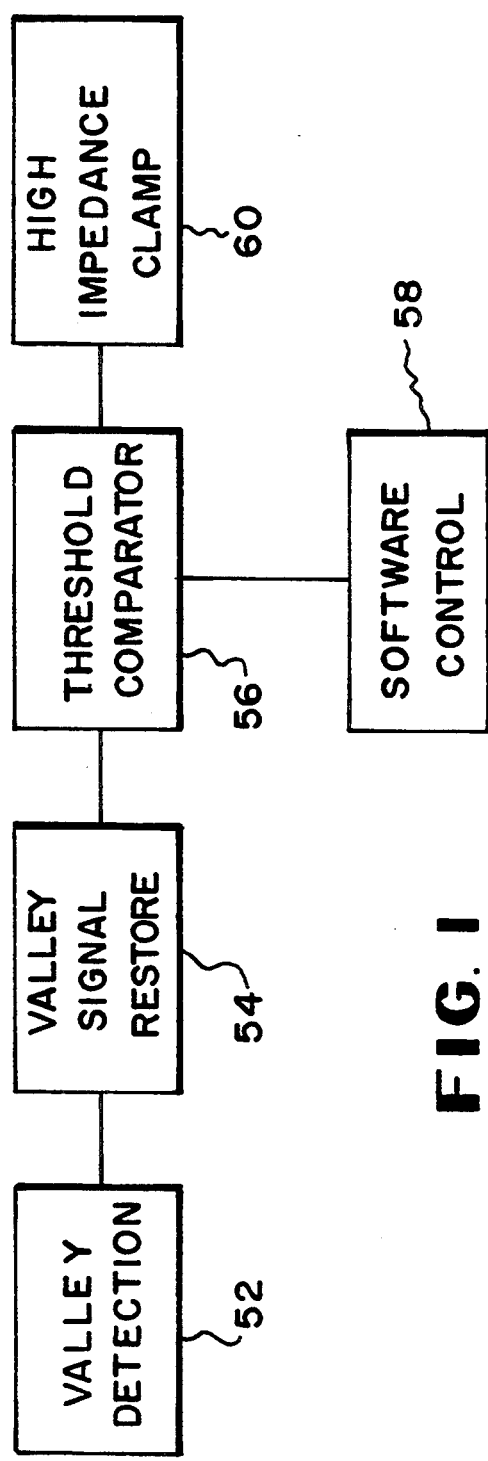
FIG. 1 is a block diagram of a false bar code inhibitor circuit for use with a digitizer of a bar code scanner in accordance with the present invention.

A false bar code inhibitor circuit 50, in accordance with the present invention, is illustrated generally in FIG. 1. The inhibitor circuit 50 includes a detector circuit 52, a signal restore circuit 54, an externally adjustable threshold comparator circuit 56, a software controller 58, and a high impedance clamp circuit 60. With the present invention, a window for a bar code read is dynamically set each time and with the window the bar code reader is able to mask false bars in the output bar code from the digitzer. Additionally, the output of the bar code digitizer output can be controlled externally with the software controller 58.

Figure 2:
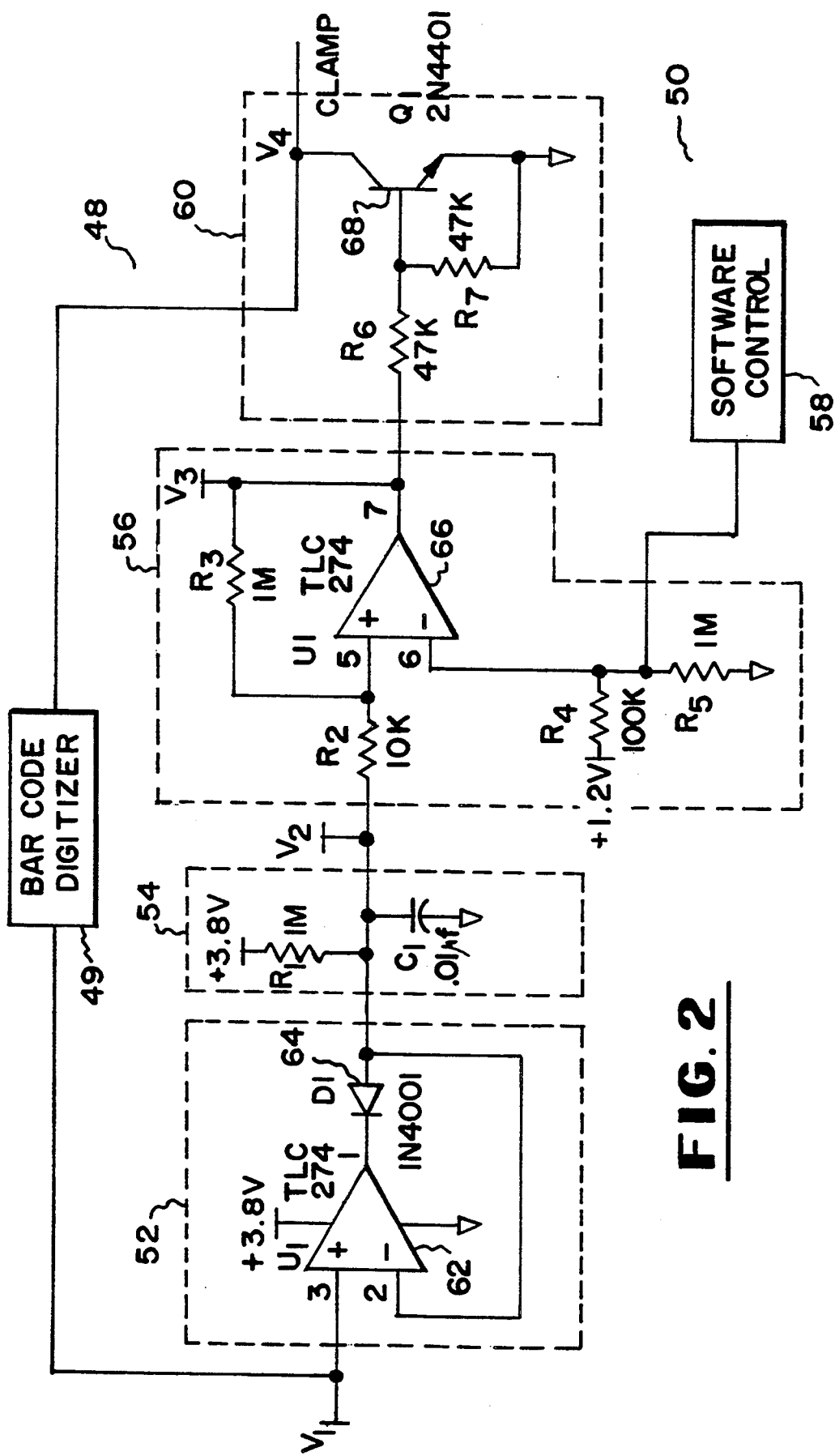
FIG. 2 is a partial block and schematic diagram of the false bar code inhibitor circuit shown in FIG. 1 in a bar code reader.

Referring to FIG. 2, a partial block and schematic diagram of the bar code inhibitor circuit in a bar code reader is illustrated. In this particular embodiment, the detector circuit 52 includes an operational amplifier 62 and a diode 64. The positive supply for the operational amplifier 62 is connected to a 3.8 volt source and the negative supply is connected to virtual ground. Other source connections could be used without departing from the scope of the invention. The noninverting input of the operational amplifier 62 is connected to a bar code digitizer 49. The operation of a typical bar code digitizer is disclosed in U.S. Pat. Nos. 5,210,397, issued May 11, 1993, and 5,200,597 issued Apr. 6, 1993, both to Eastman Kodak, et.al. which are incorporated herein by reference. The output of the operational amplifier 62 is connected to the cathode of the diode 64. The anode of the diode 64 is connected in a feedback loop back to the inverting input of the operational amplifier 62. In this embodiment, a TLC274 operational amplifier and IN4001 diode are used, although other types of amplifiers and diodes may be used.

The signal restore circuit 54 includes a resistor $R_1$ and a capacitor $C_1$. One lead of the resistor $R_1$ is connected to the 3.8 volt source and the other lead is connected to the anode of diode $D_1$. Again, different power sources could be used if desired. One lead from the capacitor $C_1$ is connected to the anode of the diode $D_1$ and the other lead for the capacitor $C_1$ is connected to virtual ground. The capacitor $C_1$ and resistor $R_1$ are selected to have a time constant which should be longer than the longest possible time needed to encounter another transition during a valid bar code read. In this particular embodiment, the capacitor $C_1$ is a 0.1 µF capacitor and the resistor $R_1$ is a 1M Ω resistor.

The comparator circuit 56 includes an operational amplifier 66 and resistors $R_2$, $R_3$, $R_4$ and $R_5$. One lead for resistor $R_2$ is connected to the anode of diode $D_1$ and the other lead is connected to the noninverting input of the operational amplifier 66. One lead of resistor $R_3$ is connected to the noninverting input of the operational amplifier 66 and the other lead is connected to the output of the operational amplifier 66. One lead of resistor $R_4$ is connected to a 1.2 volt source and the other lead is connected to the inverting input of the operational amplifier 66. One lead of resistor $R_5$ is connected to the inverting input of the operational amplifier 66 and the other lead is connected to virtual ground. In this embodiment, a TLC274 operational amplifier, 10K Ω resistor $R_2$, a 1M Ω resistor $R_3$, a 100K Ω resistor $R_4$, and 1M Ω resistor $R_5$ are used, although other types of operational amplifiers and resistors could be used as well as other voltage sources.

The software controller 58 is connected to the inverting input of the operational amplifier 66. The software controller 58 can be programmed externally to control when the inhibit circuit 50 is disabled or activated. In this particular embodiment, the software controller 58 can drive the inverting input to zero or five volts or can be short circuited from the connection. Software operating a microprocessor, such as that disclosed in the above referenced U.S. Pat. No. 5,200,597 can be used.

The high impedance clamp circuit 60 includes a transistor 68 and a pair of resistors $R_6$ and $R_7$. One lead of resistor $R_6$ is connected to the output of the operational amplifier 66 in the comparator circuit 56 and the other lead is connected to the base of the transistor 68. The other resistor $R_7$ has one lead connected to the base of the transistor 68 and the other lead connected to the emitter of the transistor 68. The emitter of the transistor 68 is connected to virtual ground and the collector is connected to the output of the bar code digitizer 49. In this embodiment, a Q1-2N4401 transistor is used and a 47K Ω for each resistor $R_6$ and $R_7$ is used, although other transitiors and resistors could be used.

Figure 3A:
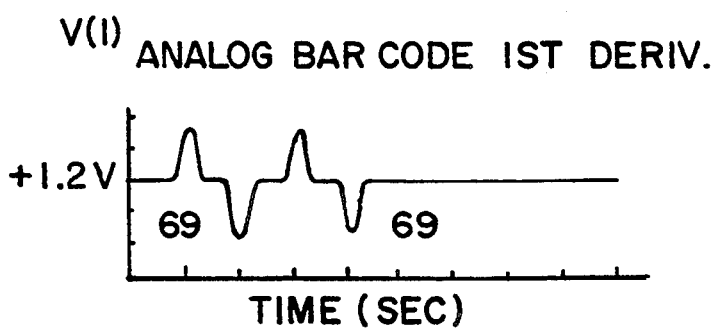
FIG. 3(a) is a timing diagram of a signal which represents the first derivative of a scanned bar code.
Figure 3B:
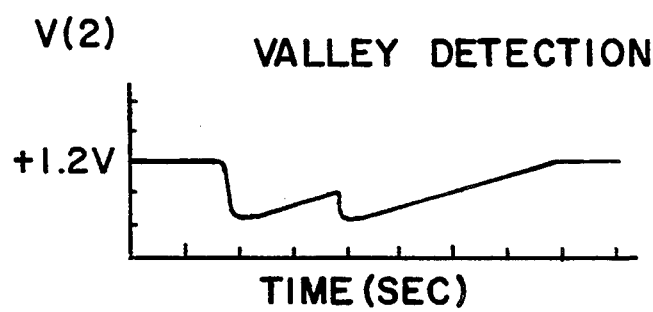
FIG. 3(b) is a timing diagram of the voltage at V(2)

The operation of the false bar code inhibitor circuit shown in FIG. 2, will now be explained with reference to timing diagrams in FIGS. 3(a)-3(d). More specifically, the first derivative of an electrical signal generated from the reflected light detected by the bar code reader is shown in FIG. 3(a). This signal is transmitted to the noninverting input at the operational amplifier in the detector circuit 52 and also to the bar code digitizer 49. Basically in this particular embodiment, the detector circuit 52 "looks" for a high to low reflective transition. The high to low transition occurs in the "valleys" 69 in the first derivative signal in FIG. 3(a). In this embodiment, when the first derivative signal drops below roughly one volt, the operational amplifier 62 outputs the negative supply which causes diode $D_1$ to begin to conduct. When the diode $D_1$ begins to conduct the capacitor $C_1$ discharges causing the voltage to drop, as shown in FIG. 3(b). When the first derivative signal goes above one volt the operational amplifier 62 switches to output the positive supply, which in this particular example is at 3.8 volts. The 3.8 volts at the cathode of the diode $D_1$ stops the diode $D_1$ from conducting and the capacitor $C_1$ begins to recharge.

The operational amplifier 66 in the comparator circuit 56 receives the signal shown in FIG. 3(b) from the signal restore circuit 54. In this particular embodiment, the inverting input is set at roughly one volt by the voltage divider circuit which includes resistors $R_4$ and $R_5$ and the 1.2 volt source. If the voltage at the noninverting input is above one volt then the operational amplifier 66 will output its positive supply which in this example is 4.0 volts, otherwise the amplifier 66 will output zero volts, which is its negative supply in this example.

The voltage at the inverting input of the operational amplifier 66 can be controlled by the software controller 58. The software controller 58 can set the inverting pin to a variety of different voltages, thus forcing the output of the operational amplifier 66 to a desired state or making an output or desired state more likely. Accordingly, the bar code inhibitor circuit allows much greater control over the bar code digitizer and can be adjusted to tune the masking window to allow only valid bar code to be output.

The output from the comparator circuit 56 controls the high impedance clamp circuit 60. If zero volts are output by the comparator circuit 66, then the transistor 68 remains off and the bar code shown in FIG. 3(d) generated by the bar code digitizer 49 passes out. If the input to the transistor 68 is approximately four volts, then the transistor 68 becomes saturated and the output from the bar code digitizer is masked. Basically, the digital bar code shown in FIG. 3(d) is logically anded to the inverted form of the signal in FIG. 3(c).

Figure 3C:
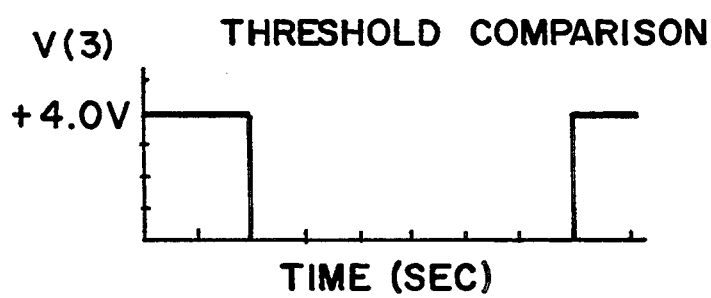
FIG. 3(c) is a timing diagram of the output voltage of the comparator at V(3)
Figure 3D:
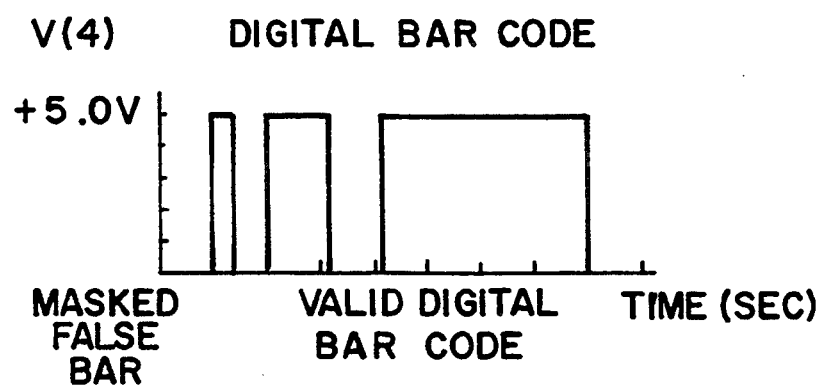
FIG. 3(d) is a timing diagram of the digital bar code with the false bar output from the bar code digitizer.

The bar code inhibitor circuit 50 enables a "window", shown in FIG. 3(c), to be dynamically generated in accordance with externally programmed instructions. With the software controller 58, the triggering transition level can be adjusted externally to a preferred or desired setting. Additionally, the output from the digitizer, even for valid code, can be stopped by the operator through programmed software.

Figure 4:
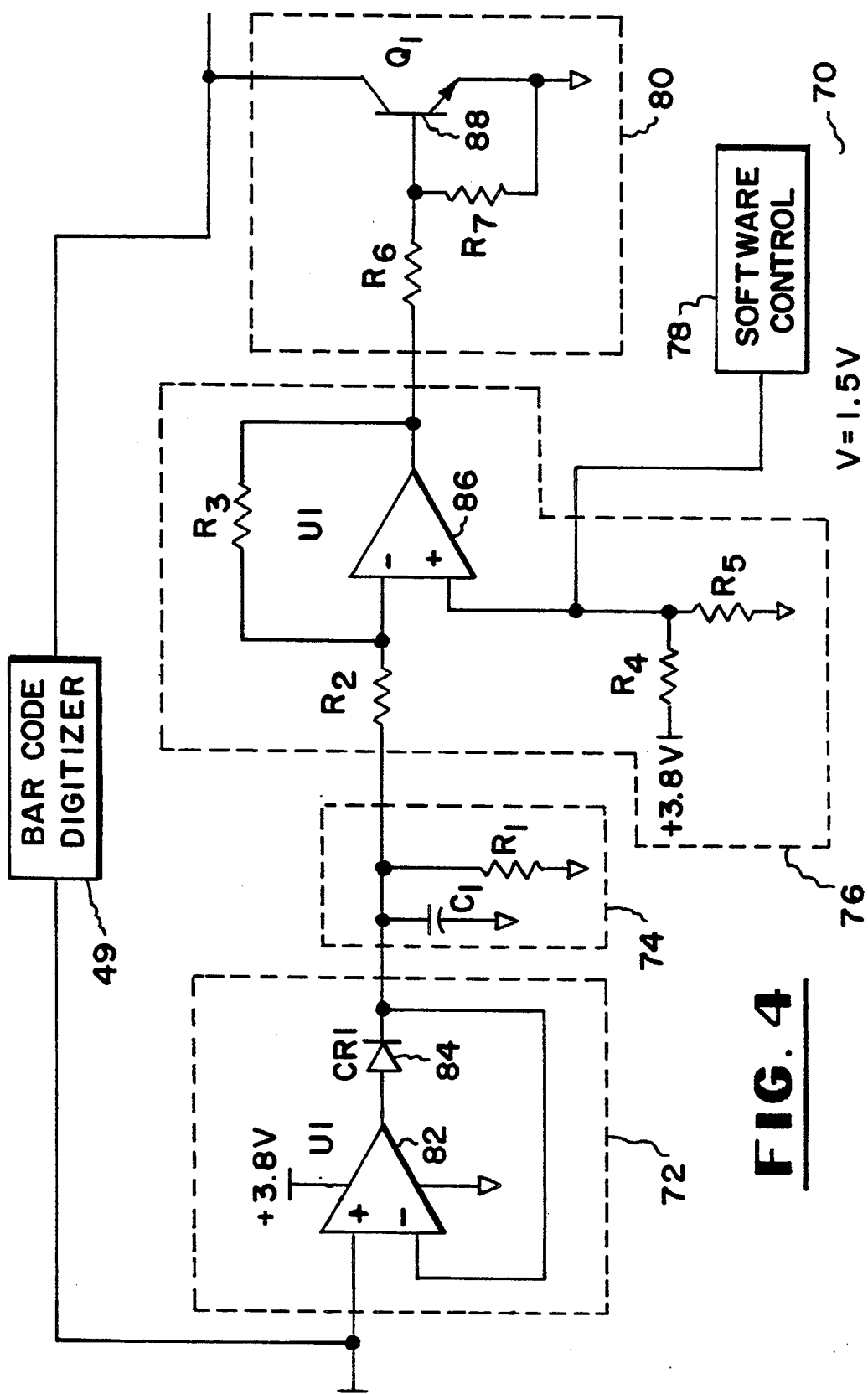
FIG. 4 is a partial block and schematic diagram of another embodiment for the false bar code inhibitor circuit and digitizer for a bar code reader in accordance with the present invention.

Referring to FIG. 4, an alternative embodiment for the false bar code inhibitor circuit 70 for a bar code reader is shown. The primary difference between the circuit in FIG. 4 and the one shown in FIG. 2, is that the circuit in FIG. 4 is a "peak" rather than "valley" detector. In other words, the circuit in FIG. 4 looks for a low to high reflective transition rather, than a high to low reflective transition.

More specifically in FIG. 4, the circuit includes a detector circuit 72, a signal restore circuit 74, an externally adjustable comparator circuit 76, a software controller 78 and a high impedance clamp circuit 80. The detector circuit 72 includes an operational amplifier 82 and a diode 84. The noninverting input of the operational amplifier 82 and the bar code digitizer 49 are connected to receive the first derivative signal. The output of the operational amplifier 82 is connected to the anode of the diode 84. The cathode of the diode 84 is connected in a feedback loop back to the noninverting input of the amplifier 82. The positive supply of the operational amplifier 82 is connected to a 3.8 volts power source and the negative supply line is connected to virtual ground. Different power sources can be used if desired.

The signal restore circuit 76 includes a capacitor $C_1$ and a resistor $R_1$. The capacitor $C_1$ and the resistor $R_1$ are set to have a time constant which is longer than the maximum time possible between reflective transitions. The capacitor $C_1$ has one lead connected to the cathode of the diode 84 and has the other lead connected to ground. Similarly, the resistor $R_1$ has one lead connected to the cathode of the diode 84 and has another lead connected to ground.

The comparator circuit 76 includes an operational amplifier 86 and resistors $R_2$, $R_3$, $R_4$ and $R_5$. One lead of resistor $R_2$ is connected to the cathode of the diode 84 and the other lead is connected to the noninverting input of the operational amplifier 86. One lead of resistor $R_3$ is connected to the noninverting input of the operational amplifier 86 and the other lead is connected to the output of the operational amplifier 86. One lead of resistors $R_4$ and $R_5$ is connected to the inverting input of the operational amplifier 86. The other lead of resistor $R_4$ is connected to a 3.8 volt power source and the other lead of resistor $R_1$ is connected to ground. The software controller 78 is connected to the inverting input of the operational amplifier 86. Again, other power sources in the comparator circuit 76 can be used if desired.

The high impedance clamp circuit 80 includes a pair of resistors $R_6$ and $R_7$ and a transistor 88. One lead of resistor $R_6$ is connected to the output of the operational amplifier 86 and the other lead is connected to the base of the transistor 88. One lead of the resistor $R_7$ is connected to the base of the transistor 88 and the other lead is connected to ground. The emitter of the transistor 88 is connected to ground and the collector is connected to the output of the bar code digitizer 49.

Basically, the false bar code inhibitor circuit 70 operates in substantially the same manner as the previously described embodiment. The primary difference is that this circuit is detecting low to high reflective transitions, instead of high to low reflective transitions. When the first derivative signal rises above about 1.5 volts, the operational amplifier 82 outputs the negative supply which is at zero volts and when the voltage drops below 1.5 volts the operational amplifier 82 outputs the positive supply, 3.8 volts. The diode 84 turns on when the voltage across it is about 0.7 volts or greater and shuts off when it is less than about 0.7 volts. When the diode 84 is on the capacitor $C_1$ becomes charged and when the diode 84 shuts off, the capacitor $C_1$ begins to discharge.

The noninverting input of the operational amplifier 86 is set by the voltage divider circuit, which includes resistors $R_4$ and $R_5$ and the power source of 3.8 volts. The software controller 78 is also connected to the noninverting input to externally control the output of the operational amplifier 86 with programmed software. When the software controller 78 does not override the voltage divider, the noninverting input is set at about 1.5 volts in this particular embodiment, although other settings could be used.

The output of the signal restore circuit 74 is transmitted to the inverting input. When the input is greater than 1.5 volts, then the operational amplifier 86 outputs the voltage from its negative supply, zero volts, otherwise it outputs the voltage from the positive supply, in this case, 3.8 volts. The transistor 88 is coupled to the output of the comparator circuit 76.

When the output from the comparator circuit 76 is 3.8 volts, the transistor 88 is saturated and output from the bar code digitizer 49 is blocked. When the output is zero volts, the transistor 88 is off and the output from digitizer 49 is not blocked.

Having thus described the basic concept of the invention, it will be readily apparent to those skilled in the art that the foregoing detailed disclosure is intended to be presented by way of example only and is not limiting. Various alterations, improvements and modifications will occur and are intended to those skilled in the art, though not expressly stated herein, these modifications, alterations and improvements are intended to be suggested hereby, and are within the spirit and scope of the invention. Accordingly, the invention is limited only by the following claims and equivalents thereto.

What is claimed is:

1. A false bar code inhibitor circuit for a bar code reader, the bar code reader generating an electric signal in response to light detected by the reader which is returned from a bar code, the bar code reader having a digitizer for generating a first derivative signal of the electrical signal, said inhibitor circuit comprising;

a detector for outputting a detection signal having either a first or a second detection state, said detector set to output the detection signal having the first detection state when a transition from either a low to a high or high to low state in the first derivative signal is detected;

a signal restorer including a capacitor set to output a restorer signal by when said capacitor is charged to a preset level, said signal restorer triggered to discharge the capacitor from the preset level each time the detection signal is in the first detection state and to recharge the restorer signal to the preset level within a predetermined time after the detector is set to output the detection signal in the second detection state;

a comparator for comparing the restorer signal against a limit and providing a comparator signal having a first comparator state when the restorer signal is below said limit and having a second comparator state when the restorer signal is above said limit;

an adjuster for adjusting the value of said limit; and a clamp for inhibiting the digitizer from outputting the electric signal when the comparator signal is in the first comparator state.

2. The inhibitor circuit as recited in claim 1 wherein said detector comprises an operational amplifier and a diode, said noninverting input coupled to receive the first derivative signal, said output of said operational amplifier coupled to the cathode of said diode, and the anode of said diode coupled to said inverting input of said operational amplifier.

3. The inhibitor circuit as recited in claim 1 wherein said signal restorer comprises a resistor and said capacitor, with one lead of said resistor connected to a voltage source and the other lead connected to the anode of diode and one lead from said capacitor connected to the anode of said diode and the other lead for said capacitor connected to ground, said resistor and capacitor are selected to have a time constant which is longer than the longest possible time needed for said detector to detect another detection signal in the first detection state for a valid bar code.

4. The inhibitor circuit as recited in claim 1 wherein said comparator comprises a second operational amplifier, a second resistor, a third resistor, a fourth resistor and a fifth resistor, with one lead for said second resistor connected to the anode of said diode and the other lead of said second resistor connected to the noninverting input of said second operational amplifier, one lead of said third resistor connected to the noninverting input of said second operational amplifier and the other lead of said third resistor connected to the output of said second operational amplifier, one lead of said fourth resistor connected to a second voltage source and the other lead of said fourth resistor connected to the inverting input of said second operational amplifier, one lead of said fifth resistor connected to the inverting input of the operational amplifier and the other lead of said fifth resistor connected to ground.

5. The inhibitor circuit set forth in claim 1 wherein said clamp comprises a transistor, a sixth resistor and a seventh resistor, with one lead of said sixth resistor connected to the output of said second operational amplifier and the other lead of said sixth resistor connected to the base of said transistor, one lead of said seventh resistor connected to the base of said transistor and the other lead of said seventh resistor connected to the emitter of said transistor, the emitter of said transistor connected to virtual ground and the collector of said transistor connected to the output of the bar code digitizer.

6. The inhibitor circuit as recited in claim 1 wherein said detector comprises an operational amplifier and a diode, said noninverting input coupled to receive the first derivative signal, said output of said operational amplifier coupled to the anode of said diode, and the cathode of said diode coupled to said inverting input of said operational amplifier.

7. The inhibitor circuit as recited in claim 1 wherein said signal restorer comprises a resistor and said capacitor, with one lead of said resistor and one lead of said capacitor connected to ground and the other lead of said resistor and the other lead of said capacitor connected to the cathode of diode, said resistor and capacitor are selected to have a time constant which is longer than the longest possible time needed for said detector to detect another detection signal in the first detection state for a valid bar code.

8. The inhibitor circuit as recited in claim 1 wherein said comparator comprises a second operational amplifier, a second resistor, a third resistor, a fourth resistor and a fifth resistor, with one lead for said second resistor connected to the cathode of said diode and the other lead of said second resistor connected to the inverting input of said second operational amplifier, one lead of said third resistor connected to the inverting input of said second operational amplifier and the other lead of said third resistor connected to the output of said second operational amplifier, one lead of said fourth resistor connected to a second voltage source and the other lead of said fourth resistor connected to the noninverting input of said second operational amplifier, one lead of said fifth resistor connected to the noninverting input of the operational amplifier and the other lead of said fifth resistor connected to ground.

9. The inhibitor circuit set forth in claim 1 wherein said clamp comprises a transistor, a sixth resistor and a seventh resistor, with one lead of said sixth resistor connected to the output of said second operational amplifier and the other lead of said sixth resistor connected to the base of said transistor, one lead of said seventh resistor connected to the base of said transistor and the other lead of said seventh resistor connected to the emitter of said transistor, the emitter of said transistor connected to virtual ground and the collector of said transistor connected to the output of the bar code digitizer.

* * * * *